UNITED STATES PATENT OFFICE.

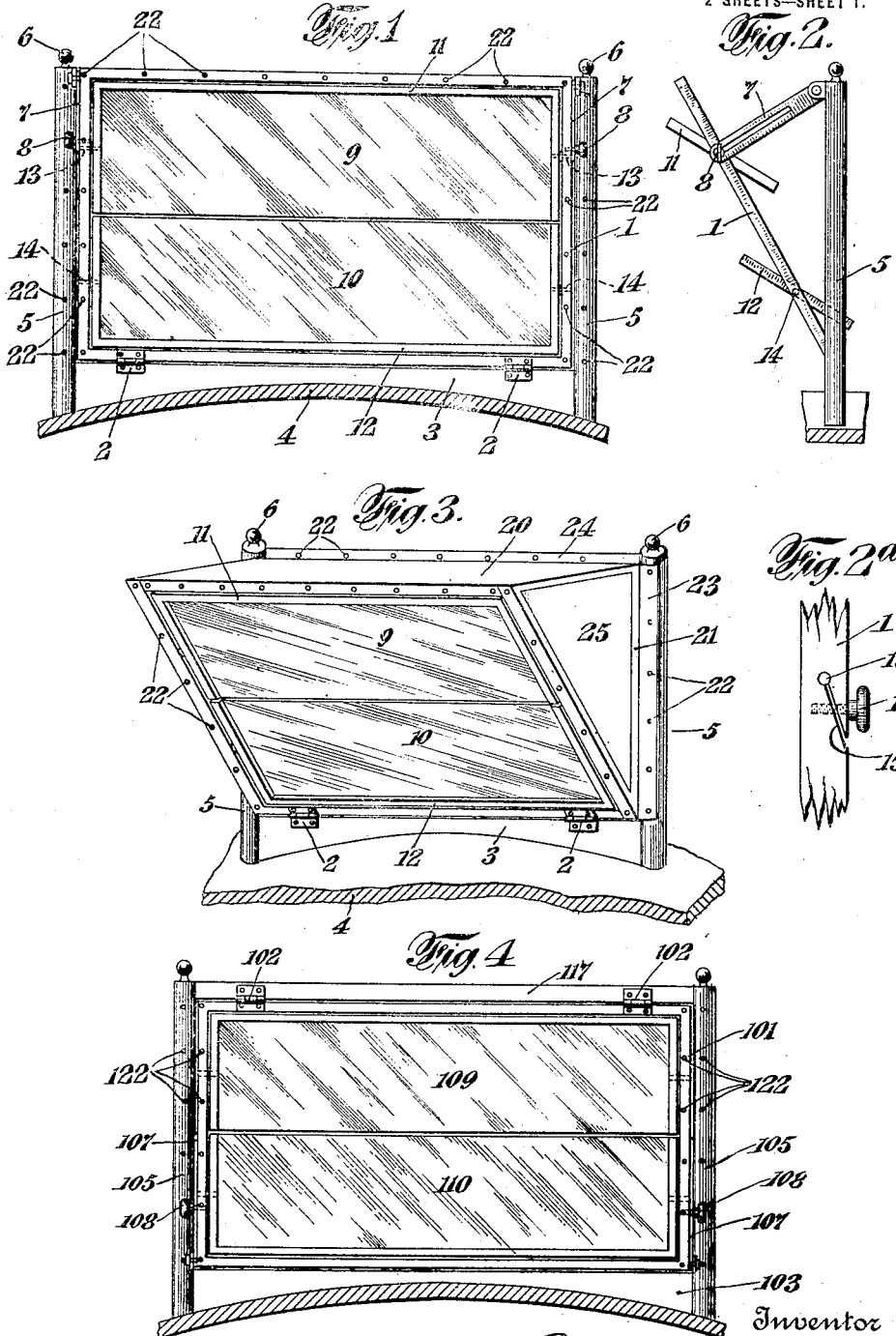

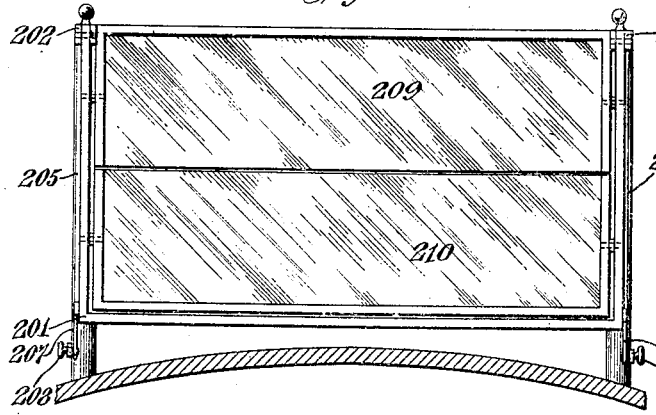
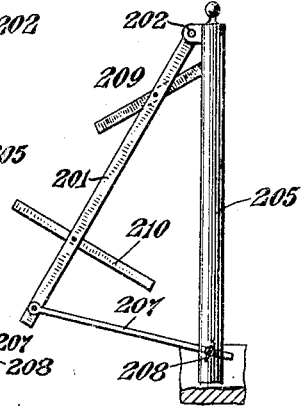
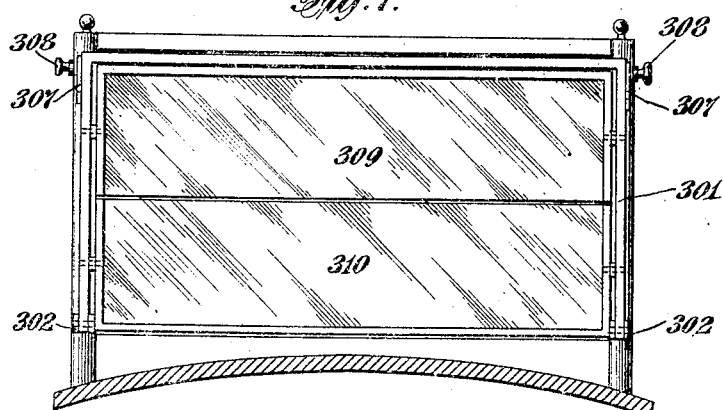
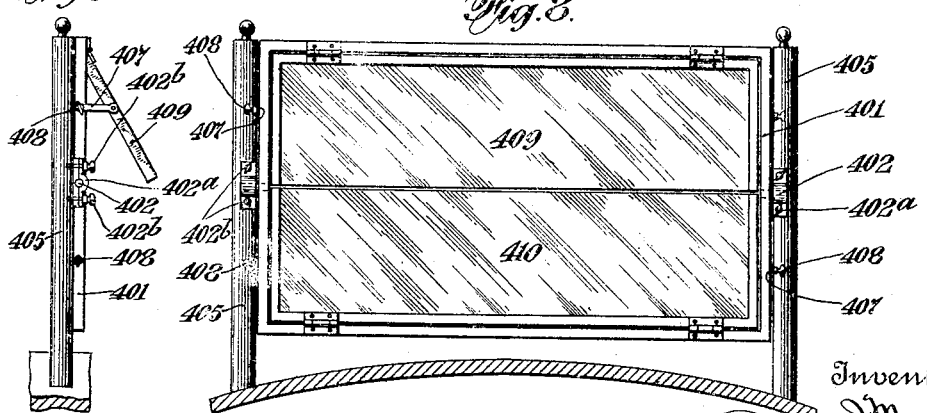

SAMUEL J. MENEELY, OF NEWBURGH, NEW YORK.

WINDSHIELD FOR AUTOMOBILES.

1,347,752.

Specification of Letters Patent. Patented July 27, 1920.

Application filed November 12, 1919. Serial No. 337,463.

*To all whom it may concern:*

Be it known that I, SAMUEL J. MENEELY, a citizen of the United States, residing at Newburgh, in the county of Orange and State of New York, have invented certain new and useful Improvements in Windshields for Automobiles; and I do hereby declare the following to be a full, clear, and exact description of the invention, such as will enable others skilled in the art to which it appertains to make and use the same.

My invention consists in the novel features hereinafter described, reference being had to the accompanying drawings which illustrate several embodiments of the invention, selected by me for the purposes of illustrating the invention, and the said invention is fully disclosed in the following description and laims.

One of the objects of my invention is to provide a wind shield for automobiles and other power driven vehicles comprising a main frame which is pivotally mounted with respect to the vehicle so that it may be moved to and retained in various positions at the will of the operator, the said main frame carrying a plurality of frames or sashes containing glass or other transparent material, filling the aperture within the main frame, and pivotally mounted therein, so as to be adjustable with respect to the main and with respect to each other, thereby affording a wide variety of positions for the elements of the protecting wind shield, while providing at all times for clear vision in front of the driver. My invention also contemplates the combination with my improved wind shield elements and the supporting means therefor, of a protecting hood for the opening produced by the tilting of the main frame with respect to its supporting members, and comprising a horizontally disposed section which may form a continuation of the top of the automobile or other vehicle, and angular sections for closing the side portions of such opening, the hood being detachably connected to the main frame of the wind shield, and to the supports therefor, and in some cases to the front portion of the top of the vehicle, and being provided with transparent portions where desirable, so as to not interfere with the vision of the operator of the vehicle.

Referring to the accompanying drawings, Figure 1 represents a front elevation of a wind shield embodying my invention, the adjacent portion of the automobile cowl being shown in section.

Fig. 2 is a side elevation of the construction shown in Fig. 1, showing the main frame in forwardly inclined open position, and the independently adjustable transparent panels swung upon their pivotal connections to provide openings between the same.

Fig. 2ª is a detail view showing a means for securing the transparent panels in adjusted positions.

Fig. 3 is a perspective view showing the wind shield in combination with a protecting hood, which in this instance covers the space at the top and sides between the wind shield, the supporting standards therefor, and the top of the vehicle.

Fig. 4 is a front elevation of a wind shield embodying a modification of my invention in which the main frame is hinged at the upper edge instead of at the lower edge as shown in the preceding figure.

Fig. 5 represents a front elevation of a wind shield representing a further modification of my invention in which a U-shaped main frame is employed and hinged adjacent to the upper edge of the shield.

Fig. 6 is a side elevation of the wind shield shown in Fig. 5.

Fig. 7 is a view similar to Fig. 5 showing the U-shaped main frame inverted and pivotally supported adjacent to the lower edge of the shield.

Fig. 8 represents a front elevation of another modification of my invention in which the main frame is pivotally supported centrally between its upper and lower edges and in which the transparent panels are hinged respectively at the upper and lower portions of the main frame.

Fig. 9 is a side elevation of the form of wind shield shown in Fig. 8.

In the preferred form of my invention illustrated in Figs. 1, 2, and 3, 1 represents the rectangular main frame of the wind shield which in this instance is pivotally connected to the vehicle adjacent to its lower edge, in any suitable or desired way. In this instance I have shown the frame 1 connected by means of hinges 2 with a spacing strip 3 fitting over the cowl of an automobile, which is illustrated in section at 4. At each side of the main frame a standard 5 is provided which in the open type of car will ordinarily be secured to the body of the vehicle in any desired way, and preferably provided as shown with buttons 6 for the attachment of an extension top or other protection against the elements, as is customary in certain classes of open cars, or which may be independent of the top if the top is entirely supported from the rear portion of the body. In order to hold the main frame of the wind shield in adjusted positions, at an angle with the posts or standards 5, any desired adjusting and securing means may be employed. In this instance I have shown slotted links 7 pivotally secured to the standards adjacent to their upper ends, and having slotted portions engaging set screws 8 secured to the main frame, and provided with winged heads for adjustably securing the links with respect to the frame 1, so as to hold it in any desired angular position. Within the main frame 1 I provide a plurality of transparent panels 9—10, located one above the other. I prefer to use for this purpose two panels of heavy plate glass securely mounted within the frames 11 and 12 respectively, which are preferably made of metal and surround the glass on three sides only, so that the meeting edges of the panels 9 and 10 may approach each other with the least possible interruption of vision, and if desired, a rubber weather strip may at times be employed to close the narrow crack between these glass panels in case of rain, in a well known way, as will be readily understood. The panel frames 11 and 12 are pivotally mounted in the main frame on pivot pins, indicated at 13—13, and 14—14, located substantially centrally of the vertical width of each panel, so that each of the panels may be adjusted on its pivotal connections, independently of the main frame, and independently of each other, as indicated for example in Fig. 2, thus providing open spaces between the transparent panels themselves, and between the upper and lower members of the main frame, and adjacent panel, for the passage of air when this is desired, and also when it is not desired to look forward through the transparent panels. I may use some other transparent material as celluloid if desired, but I prefer to employ plate glass in the construction of these panels. The pivotal connections for the panels 9 and 10 will preferably operate with considerable friction so that the panels will remain in any position to which they may be moved, and any desired or usual means may be employed for keeping these pivotal connections tight, or if desired, special means may be employed for adjusting them, and in Fig. 2ª for example, I have illustrated a simple means for accomplishing this result, which consists in slotting the main frame 1 adjacent to the aperture which receives one of the pivotal connections, as the pivot 13, the slot being indicated at 15, and a shouldered adjusting thumb screw 16 being passed through the slotted portions of the frame, so as to clamp the pivot pin 13.

In driving in inclement weather, with the main frame tilted forward in the position indicated in Fig. 2, it is obvious that the rain would beat in over the top of the wind shield between its upper edge and the forward edge of the top or top extension of the vehicle, and also at the sides, and I therefore prefer to provide a hood of flexible material to cover these spaces, which can be folded up compactly when not in use. I have illustrated such a hood in Fig. 3, the same comprising a horizontal, rectangular member 20, and two triangular side members 21, formed integral therewith, or suitably connected thereto, this hood being preferably composed of suitable weather proof material, as pantasote, heavy canvas, or the like, and provided along its edges with means for detachably securing it to the adjacent parts of the main frame 1, the standards 5, and the front edge of the top of the vehicle. For this purpose I prefer to employ the well known type of male and female snap fastener, and in such case the front face of the main frame 1 will be provided with the necessary securing studs 22 along its vertical and upper horizontal members, to receive the corresponding female members carried by the edges of the hood, and the front faces of the standards will be likewise provided with similar studs 22 to receive the corresponding female members on a lateral extension 23 of the hood, as shown in Fig. 3. The rear edge of the top portion 20 preferably has an upturned portion or edge 24 provided with female snap fastening members to engage corresponding male snap fastening members on the inner face of the forward edge of the vehicle top, as will be readily understood, so as to prevent the water from passing in between the rear edge of the section 20 of the hood and the top of the vehicle. The hood is preferably provided with transparent portions, in some or all parts of its sections, as may be found desirable. I prefer to provide the side sections 21 with transparent panels 25, as indicated in Fig. 3, and these may be made of celluloid or other suitable flexible transparent material. As shown in Fig. 3, the wind shield can be tilted forward and protected to a large extent from the rain, while the hood 21 completely closes the openings, which would otherwise be formed between the upper edge and sides of the frame, and the top and side curtains of the car, thus affording complete protection to the occupants, and making the glass panels less liable to become obscured by rain or snow. At the same time the swinging panels, 9, 10, may be, one or either, opened to a greater or less extent, to afford some ventilation if desired, and the forward angular position of the main frame will be found to be very desirable in many instances. If it is not desired to tilt the main frame forward, the hood 20—21 may be dispensed with and the entire main frame tilted back in line with the standards 5 and secured in this position, while at the same time the swinging panels 9, 10, may be manipulated according to the wishes of the operator.

In Fig. 4 I have shown a modification of my invention in which the main frame, here designated at 101, is secured by hinges 102 to a cross bar 117 connecting the upper ends of the standards 105, the frame being suspended between this cross bar and the spacing strip 103, and carrying the transparent panels 109—110, constructed and operating exactly as heretofore described. In this instance it will be understood that the main frame will be swung inward or outward from the bottom and held in adjusted position by means of links 107 and set screws 108 in the same manner as hereinbefore described, with reference to the form shown in Figs. 1, 2, and 3. It will also be understood that if it is desired to close the openings at the bottom and sides between the frame and the supporting members therefor, the hood 20—21 shown in Fig. 3 may be applied to the under side of the main frame between it and the spacing bar, and between the sides of the frame and the standards, so as to close these spaces and prevent the ingress of water in substantially the same manner as shown in Fig. 3, except that the position of the hood will be inverted, as will be readily understood, and I have shown the main frame and standards provided with the male fastenings 122 for this purpose.

In Figs. 5 and 6 I have shown a slight modification of my improved wind shield, in which the main frame, here indicated at 201, is of U-shaped construction having its upper end portions pivotally secured to ears 202 on the front face of the standards 205, the main frame being provided with pivoted or swinging transparent panels, indicated at 209 and 210, supported and operating in the manner hereinbefore described. In this instance I have shown a different means for adjusting and holding the main frame, which consists in this instance of a pair of eye rods 207 pivotally connected to the main frame, and extending through apertures in the standards 205, in which they may be secured by means of adjusting screws 208 so as to hold the main frame in different angular positions with respect to the standards.

In Fig. 7 I have shown another modification of my invention, in which a U-shaped frame 301 is employed, said frame being inverted and having the lower ends of its lateral members pivoted to ears on the standards at 302 adjacent to the lower ends thereof, the said frame carrying the swinging panels 309 and 310, substantially as hereinbefore described, and the main frame being adjustable at its upper end in this instance, by means of eye rods 307 secured by set screws 308, substantially as hereinbefore described, with reference to Figs. 5 and 6, except that these rods and screws are located adjacent to the upper edge of the frame in the form shown in Fig. 7. It will be understood that with either of the forms shown in Figs. 5 and 6 or 7 the hood described in Fig. 3 may also be used, by providing the adjacent portions of the frame and standards with the necessary fastening means.

In some instances I may provide the main frame of the wind shield with horizontal pivots located centrally with respect to its vertical width where this seems to be desirable, and I have illustrated such a construction in Fig. 8, in which the main frame 401 is hinged or pivoted in this manner, the frame being preferably provided with pintles 402 extending through bearings 402$^a$ secured to the standard 405. In order to secure these pintles against rotation, I conveniently form the bearing in two parts connected by clamping screws 402$^b$, as shown in Fig. 9, so that by loosening one or other of these screws the main frame 401 can be swung on its pivotal connection with the standards and locked in position by tightening the screws 402$^b$. I do not, however, limit myself to this form of means for pivoting and holding the frame in adjusted position.

The frame 401 is shown in Fig. 8 provided with transparent panels 409—410, which in this instance are hinged or pivoted at their upper and lower edges respectively instead of being pivoted centrally as in the preceding figures of the drawings. In this instance the transparent panels 409—410 may be each provided with adjusting mechanism similar to that shown for adjusting the main frame illustrated in Figs. 1, 2, and 3 for example, and I have indicated in Figs. 8 and 9 slotted links 407 and set screws 408. Obviously this arrangement for the transparent panels can be employed in connection with any of the other forms of main frame herein illustrated, although I prefer to employ the form in which the transparent panels are pivoted centrally of their vertical width.

It will be seen that my improved wind shield, while possessing all the advantages of other shields, has the additional advantage of being so constructed and arranged that it may be secured in a rearwardly inclined position, in a forwardly inclined position, and in intermediate positions, without interfering with the independent adjustment of the transparent panels. By adjusting the main frame so that it inclines forwardly from bottom to top, and closing the transparent panels, rain, snow, and dust particles will be driven downwardly by the force of the air against the shield, aided by the force of gravity, thus tending to keep the transparent panels free from moisture or dust in driving. By means of the hood hereinbefore described, the opening formed by tilting the main frame into the forwardly inclined position, either by swinging the upper edge outwardly or the lower edge inwardly, or both, may be closed to prevent rain, snow, or dust from entering the vehicle. My improved shield can be manufactured at a slight additional cost over the ordinary shield at present in use, and presents an extremely neat appearance.

What I claim and desire to secure by Letters Patent is:—

1. In a wind shield for vehicles the combination of a main frame, pivotally connected to the vehicle, and capable of swinging bodily on said pivotal connections, means for holding said frame rigidly in adjusted position, and transparent panels pivotally connected with the main frame and arranged one above another, and adjustable on their pivotal connections, independently with respect to each other and the main frame.

2. In a wind shield for vehicles, the combination of a main frame, connected to the vehicle by pivotal connections having horizontal axes, adjustable securing devices for holding said main frame in adjusted positions, and a plurality of transparent panels arranged one above the other in said main frame and connected thereto by pivotal connections having horizontal axes, said panels being movable on their pivotal axes with respect to each other and the main frame, and means for independently securing said panels in their adjusted positions.

3. In a wind shield for vehicles, the combination of vertically disposed standards, a main frame pivotally supported adjacent to said standards, adjustable means for securing the main frame in different positions with respect to said standards, a plurality of transparent panels pivotally mounted in the main frame, and adjustable on their pivotal connections with respect to the main frame and each other.

4. In a wind shield for vehicles, the combination of vertically disposed standards, a main frame pivotally supported adjacent to said standards, adjustable means for securing the main frame in different positions with respect to said standards, a plurality of transparent panels pivotally mounted in the main frame, and adjustable on their pivotal connections with respect to the main frame and each other, and a detachable hood provided with a horizontal portion, and substantially triangular, vertical, lateral portions for closing the space between the main frame and standards when the main frame is in forwardly adjusted position.

5. In a wind shield for vehicles, the combination of vertically disposed standards, a main frame located adjacent to said standards and supported pivotally at its lower edge, adjustable securing devices for holding said frame in different positions with respect to said standards, and a plurality of transparent panels pivotally mounted in said main frame upon horizontal pivots, and adjustable thereon with respect to each other and the main frame.

6. In a wind shield for vehicles, the combination of vertically disposed standards, a main frame located adjacent to said standards and supported pivotally at its lower edge, adjustable securing devices for holding said frame in different positions with respect to said standards, and a plurality of transparent panels pivotally mounted in said main frame upon horizontal pivots, and adjustable thereon with respect to each other and the main frame, a hood having a horizontal portion and downwardly extending substantially triangular lateral portions, and detachable means for securing said hood to the main frame, the said standards, and the forward edge of the top of the vehicle.

In testimony whereof I affix my signature.

SAMUEL J. MENEELY.